United States Patent
Schenk et al.

(10) Patent No.: US 7,034,936 B2
(45) Date of Patent: Apr. 25, 2006

(54) SPECTROMETER

(75) Inventors: Harald Schenk, Dresden (DE);
Heinrich Grueger, Dresden (DE)

(73) Assignee: Fraunhofer Gesellschaft zur Foerderung der angewandten Forschung e.V., Munich (DE)

(*) Notice: Subject to any disclaimer, the term of this patent is extended or adjusted under 35 U.S.C. 154(b) by 38 days.

(21) Appl. No.: 10/916,835

(22) Filed: Aug. 11, 2004

(65) Prior Publication Data

US 2005/0057750 A1    Mar. 17, 2005

Related U.S. Application Data

(63) Continuation of application No. PCT/EP2002/001507, filed on Feb. 13, 2002.

(51) Int. Cl.
*G01J 3/06* (2006.01)
*G01J 3/18* (2006.01)

(52) U.S. Cl. .................. 356/328; 356/308
(58) Field of Classification Search .......... 356/308, 356/326, 328
See application file for complete search history.

(56) References Cited

U.S. PATENT DOCUMENTS

| | | | |
|---|---|---|---|
| 5,497,231 A | 3/1996 | Schnidt | 356/334 |
| 5,963,320 A | 10/1999 | Brooks et al. | 356/310 |

FOREIGN PATENT DOCUMENTS

| | | |
|---|---|---|
| DE | 19955759 | 11/1999 |
| EP | 378 108 | 6/1995 |
| GB | 1050561 | 12/1966 |

*Primary Examiner*—F. L. Evans
(74) *Attorney, Agent, or Firm*—Michael A. Glenn; Glenn Patent Group

(57) ABSTRACT

The present invention is based on the knowledge that the advantages of a moveable dispersive element with regard to the simple detector element and the adjustability of the measurement range and the resolution can also be used in a miniaturization of a spectrometer, when the dispersive element is operated generally in resonance instead by a quasi-static drive. A proposed spectrometer comprises a vibratably suspended dispersive element for spectrally decomposing a light beam, whose spectral distribution is to be determined, into spectral components, a means for putting the vibratably suspended dispersive element into a vibration with a frequency, which is in such a ratio to the natural frequency of the vibratably suspended dispersive element that a resonance amplification of the voltage of the dispersive element occurs, and a detector for detecting a spectral component of the light beam.

9 Claims, 2 Drawing Sheets

SPECTROMETER

CROSS-REFERENCE TO RELATED APPLICATIONS

This application is a continuation of copending International Application No. PCT/EP2002/001507, filed Feb. 13, 2002, which designated the United States and was not published in English.

BACKGROUND OF THE INVENTION

1. Field of the Invention

The present invention relates generally to spectrometry, such as emission, absorption or transmission spectroscopy, and particularly to a spectrometer, which can be realized as microspectrometer.

2. Description of the Related Art

With the spectrometer, it is possible to measure light in a certain spectral range in a wavelength-dependent way. Center piece of every spectrometer is a dispersive element, such as a grating or prism, which light enters, whose spectral distribution is to be determined, and which decomposes the incident light into its spectral components, and a corresponding detector for sensing one or several of the spectral components. FIG. 3 shows a conventional arrangement of a grating spectrometer. A moveable grating is illuminated by an entrance slit and a collimating element (not shown) with a light beam 902, whose spectral distribution is to be determined. The movable grating 900 is rotatably mounted, wherein the adjustment of the grating 900 is performed quasi-statically, typically via a step motor. The light 906 split into wavelengths—specifically, a spectral component of the same—is detected by detector element 908, while the grating 900 is moved into different positions. In that way, the light 906 split into wavelengths is sampled by the detector 908, wherein its measurement signals are shot correspondingly to determine the spectral distribution of the light beam 902.

For so-called low-cost applications, devices of the type of FIG. 3 are too expensive and too costly due to their expensive mechanical control of the quasi-static movement of the grating 900. Additionally, the type of device of FIG. 3 is sensitive against shock and temperature variations and the light proofness of the housing (not shown) of these devices has to be ensured despite all required device feeding lines, for, for example, the mechanical drive of the grating 900 and the operation of the detector element 908. Particularly, the measurement length for determining the spectral distribution of the incident light 902 is too long.

Apart from the conventional solutions of FIG. 3, miniature spectrometers in the form of PC plug in cards or in the form of smaller external housings with a corresponding computer interface have existed for several years. The basic setup of these miniature spectrometers is shown in FIG. 4. A grating 920, to which the light beam 902 enters, a photodiode line 922 as well as a required control logic (not shown) is disposed on a board (not shown). In these miniature spectrometers, the grating 920 is disposed fixed or pinned and is in an encapsulation (not shown), together with the photodiode line 922. An example for a miniature spectrometer of the type shown in FIG. 4 is, for example, shown in DE 19836595A1.

Although the prices of such spectrometers with fixed grating are low, it is a disadvantage of these fixed grating systems, that the wavelength range detected by the photodiode line 922 as well as the spectral resolution are set during production and are thus invariable. One possibility to adapt wavelength range and spectral resolution to a particular application based on an existing supply of such fixed grating spectrometers, is merely the usage of several spectrometers in parallel in a master-slave operation, wherein several spectrometers of different resolution and different wavelength ranges, respectively, are coupled. Thereby, however, additional costs per slave module occur. Additionally, a flexible solution where the detectable wavelength range as well as the spectral resolution can be changed any time is also not obtained by this modular coupling of several modules.

One specific problem in the design of miniature spectrometers is that the available space is limited, whereby, on the one hand, the detectable detection range and, on the other hand, the obtainable resolution is limited. The detectable wavelength range depends on the fixed grating dimensions, particularly the grating distance and the distance of the grating from the detector element, the so-called base length. Apart from other amounts, such as the amount of an entrance or exit slit and the utilized refractive order, the resolution of the spectrometer depends on the base length, the grating number and the distance of the photodiode elements of the photodiode line and the exactness of the grating positioning, respectively. If, for example, by using a photodiode line with fixed density and by considering maximum dimensions, a spectrometer of the type of FIG. 4 is designed for high resolution, this is performed at the cost of the detectable spectral range, and conversely, if the spectrometer is designed for a large spectral range, a poorer resolution results.

Typical process spectrometers, which are formed in the form of two-line spectrometers with fixed grating and CCD or photodiode line, use line photo detectors with typically 1024 to maximum 2048 lines. For separating two spectral lines, theoretically, at least three line elements are required, wherein, however, practically about 5 to 7 lines are required for separating spectral lines. Assuming the usage of an optical fiber as a slit and the base length of a PC card spectrometer, a resolution in the range of 0.2 nm in a spectral detection range of 60 nm results with these line spectrometers. This resolution is sufficient for many applications, but the resulting spectral detection range is too small for many applications, since, for evaluation, usually two or more spectral lines of the spectrum to be examined have to be taken into consideration and thus have to be within the detection range. Alternatively, if the spectrometer is designed for a lower resolution, a larger range of, for example, 600 nm can be achieved, such that it would be sufficient for the spectroscopy across the visible spectral range, i.e. for the wavelengths of 400 nm to 800 nm, but the resulting resolution of 2 nm provides only a very poor quality.

As the previous discussion has shown, there is a need for a spectrometer type which can be produced micromechanically, has a high mechanical stability and sufficient properties both with regard to the spectral detection range and the spectral resolution and can at the same time be produced at low cost. In the above conventional spectrometer solution of FIG. 3, there are problems in a miniaturization with regard to the producible deflections of the grating, which again limits the spectral detection range. Further, the expensive control for the quasi-static movement prevents a cost-effective realization. In the fixed grating systems of FIG. 4, no high resolution can be realized with a simultaneous large spectral detection range.

SUMMARY OF THE INVENTION

It is the object of the present invention to provide a spectrometer as well as a method for determining a spectral distribution, so that with relatively low cost and despite miniaturization both a satisfying spectral resolution and a satisfying spectral detection range and/or a high mechanical stability can be obtained.

In accordance with a first aspect, the present invention provides a spectrometer, having a vibratably suspended dispersive element for spectrally decomposing a light beam, whose spectral distribution is to be determined, into spectral components; a means for putting the vibratably suspended dispersive element into vibration with a frequency, which has such a relationship to the natural frequency of the vibratably suspended dispersive element that a resonance amplification of the vibration of the dispersive element occurs; a detector for detecting a spectral component of the light beam; wherein the dispersive element is a micromechanically produced mirror with a grating structure, which is formed in a semiconductor chip.

In accordance with a second aspect, the present invention provides a method for determining the spectral distribution of a light beam, comprising spectrally decomposing the light beam whose spectral distribution is to be determined, into spectral components by a vibratably suspended dispersive element, wherein the vibratably suspended dispersive element is a micromechanically produced mirror with a grating structure, which is formed in a semiconductor chip; putting the vibratably suspended dispersive element into a vibration with a frequency, which has such a relationship with the natural frequency of the vibratably suspended dispersive element that a resonance amplification of the vibration of the dispersive element occurs; and detecting a spectral component of the light beam by a detector.

The present invention is based on the knowledge that the advantages of a movable dispersive element and a monochromator, respectively, with regard to the simple detector element and the adjustability of the measurement range and the resolution can also be utilized with a miniaturization of a spectrometer, when a vibratably suspended dispersive element is operated essentially in resonance or with a vibration with a frequency, which is in such a ratio to the natural frequency of the dispersive element that a resonance amplification of the same occurs, instead of operating same with a quasi-static drive. Compared to the miniature spectrometers with fixed gratings, there is no requirement for an expensive and costly detector line. Additionally, the detection range is not or hardly limited by the size dimensions. Compared to the quasi-static control of the dispersive element, the inventive resonant control of the dispersive element leads to high obtainable deflections with acceptable energy effort, due to the occurring resonance amplification even with a realization in miniaturized form, such as in CMOS compatible micromechanical technology, whereby again a higher spectral detection range is enabled. Additionally, a vibration enabling suspension of the dispersive element effects an increase of the mechanical stability against vibration, which again increases the attractivity of the inventive determination of the spectral distribution against the previous spectrometer solution for application fields where adverse conditions prevail and for example shocks and other outer vibrations occur, such as in the automobile field.

According to an embodiment of the present invention, a spectrometer consists of the dispersive element, a single detector element and a control for substantially resonating the dispersive element, such as a vibration mirror with a grating structure. A synchronization means synchronizes the drive with a detector, so that the sample or shutter times are synchronized with the essentially resonant vibration.

For every detected spectral component of the detector, the current position of the dispersive element is detected, wherein the wavelength, which corresponds to the current setting of the dispersive element, is associated with the spectral component.

According to a specific realization of the present invention, a spectrometer consists of a micromechanically produced vibrating mirror with grating structure, a photodiode or a CCD line, a control means, which is coupled to a drive of the vibrating mirror, and controls the exposure times of the detector, as well as a combination means which combines successive shots and exposures, respectively, of the photodiode line, to detect the spectral distribution of the incident light.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 3:
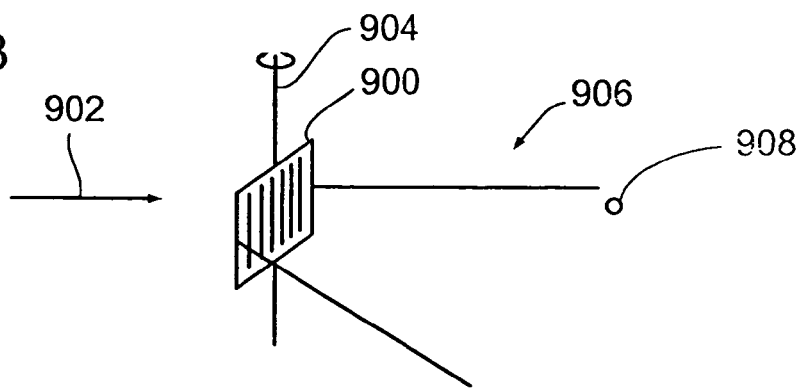
FIG. 3 is a schematic representation of a conventional spectrometer type.
Figure 4:
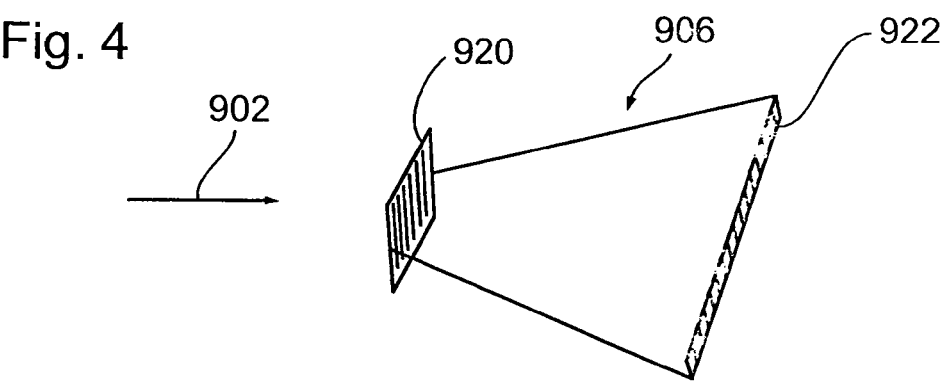
FIG. 4 is a schematic representation of a further conventional spectrometer type.
Figure 1:
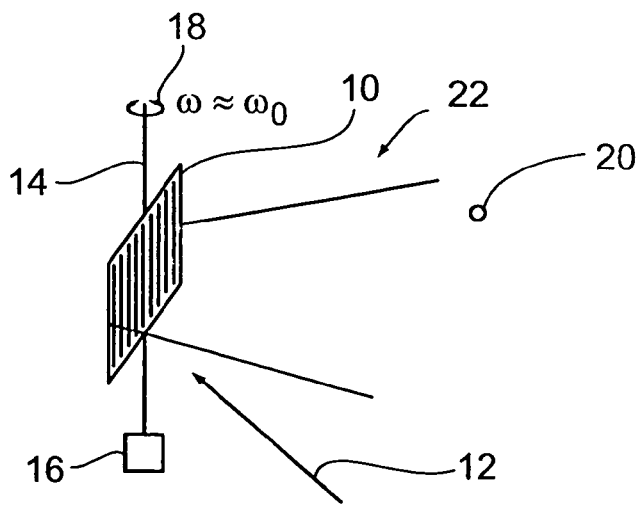
FIG. 1 is a schematic representation of a spectrometer setup according to an embodiment of the present invention.

First, with regard to FIG. 1, a simplified representation of a spectrometer is described according to an embodiment of the present invention. The spectrometer of FIG. 1 comprises a movable grating 10, which receives an incident light beam 12, whose spectral distribution is to be determined. The movable grating 10 is designed as vibratably suspended mirror with a grating structure and is, in the present case, vibratably rotatably mounted and suspended, respectively, around an axis 14. The suspension (not shown) of the movable grating 10 defines a restoring force, which depends on the deflection of the movable grating 10 from the resting position. The suspension consists, for example, of two ridges, which support a frame of the grating (in the FIG. from the top and the bottom) along the axis 14 at two opposing side centers, wherein the restoring force corresponds to the torsion force, which is established by torsion of the ridges during vibration. Further, a different suspension can be provided, such as a cantilevered suspension with shear forces. Further, a resonance frequency $\omega_0$ for vibrations around the resting position around the axis 14 is associated with the movable grating 10, which depends on the spring constant of the suspension and holder, respectively, as well as the dimensions of the grating 10.

A drive and a control 16, respectively, puts the movable grating 10 into vibration 18 with a frequency $\omega$, which is close to resonance frequency ($\omega=\omega_0$). The drive of the grating 10 is performed, for example, in an electrostatic, inductive, capacitive or piezoelectrical way. The drive consists, for example, of interdigital electrodes, a movable one at the grating 10 and a fixed one.

The frequency, by which the vibration of the grating 10 is exited, is at least within a range close to the resonance frequency, where the resonance amplification occurs to a sufficient degree for the respective application case, such as in a range of 90% of the resonance and natural frequency, respectively, up to 110% of the resonance frequency, or a range where the resonance amplification effects at least a 10% rise of the deflection and amplitude, respectively, of the vibration of the grating 10, as it would occur with the same excitation force (amplitude) in the case of constant excitation (frequency equal zero). The degree of resonance amplification depends on the quality factor of the vibration system of holder and suspended grating.

A detector 20 is disposed to receive part of the light 22 split into its spectral components by the movable grating 10, which impinges on detector 20 and to detect its intensity. The detector is disposed in a predetermined distant behind (seen from the direction of the light beam) the grating 10, the so called base length. The intensity detected by the detector 20 at a given time corresponds to the spectral portion of the light beam 12 at a wavelength, which is associated with the current position of the grating 10 during vibration. The maximum deflection of the grating 10 defines consequently the maximum detectable detection range of the spectrometer of FIG. 1.

Due to the resonance amplification occurring in the resonant operation of the grating 10, a satisfying deflection can be obtained by the drive 16 even with a high degree of miniaturization. The high restoring forces, which result during suspension and holding, respectively, in the case of a realization of a grating 10 in a semiconductor chip due to the high rigidity of silicon or the respectively used semiconductor material, can be overcome in this way by using the resonance amplification, so that sufficient deflections and thus a high detectable wavelength range results.

To determine a spectral distribution of the light beam 12 across a wavelength range, the detector 20 detects and samples, respectively, the light 22 split into its spectral components by the movable grating 10 at successive times, while the grating vibrates in resonance. The intensity detected by the detector 20 at a certain time corresponds to that spectral component of the light beam 12 and that wavelength, respectively, which is associated with the current position of the movable grating 10 at the time of detection by the position between the detector 20 and the movable grating 10. After detecting the spectral components of the light beam 12 at several wavelengths, the determination of the spectral distribution is terminated. For improving the signal noise ratio, several measurements can be averaged.

For selecting the exposure or sample times, respectively, when the detector 20 performs a sample of the light 22 split into its spectral components, and thus the sample wavelengths, a control unit (not shown) can be connected to the detector 20 to send trigger impulses to the same, and to the drive 16 to obtain a signal, which indicates the current position, from the same. There are several possibilities for controlling the exposure times. According to a first possibility, both the mechanical grating 10 and the detector 20 are operated with fixed vibration and exposure frequencies, respectively, wherein the control unit synchronizes the operation of the detector 20 and the operation of the control 16 appropriately. The detection and sample frequency, respectively, of the detector 20 is for example, an integer plurality n of the vibration frequency ω, so that every determination of the spectral distribution, which means every full shot of a spectrum consists of n shots and is repeated per vibration. Alternatively, the sample frequency of the detector 20 can be a fully rational plurality n/m (n, m relatively prime) of the vibration frequency ω, so that every determination of the spectral distribution consists of n*m sample values and every mth vibration is repeated.

It is a further possibility that the detector 20 is synchronized with the drive 16, such that the same performs the detection always at a fixed wavelength, i.e. always when the movable grating is in a particular position. For example, by manual or automatic varying the predetermined position and thus the associated wavelength, the desired wavelength range can be sampled, wherein the detector 20 outputs a sample value per vibration of the movable grating 10, which corresponds to the intensity of the light 12 at the currently set wavelength. With the latter possibility, the control unit takes over, for example, the synchronization of the detector 20 and the drive 16 and sets the wavelength currently to be sampled via a phase shift between the exposure and the vibration frequency.

The maximum wavelength range detectable by the spectrometer of FIG. 1 is determined by the grating dimensions of the movable grating 10, the positional relationship between the movable grating 10 and the detector 20 as well as the maximum deflection of the movable grating 10. Due to the inventive operation of the movable grating 10 in the resonance range it is possible, as mentioned above, due to the resonance amplification to generate sufficient deflections 10 with an acceptable energy effort, even in the case of a micromechanically movable grating, so that a large detectable detection range is ensured.

Apart from physical limitations, the maximum resolution of the spectrometer of FIG. 1 is not subject to any further limitations, so that a realization of the spectrometer of FIG. 1 can operate with a technically maximum possible resolution. Compared to the spectrometers with a quasistatically operated grating described in the introduction of the specification, an expensive grating control is omitted, which is mechanically very sensitive against shock and vibration and very expensive compared to the inventive resonant vibration of the grating.

It is another advantage of the spectrometer of FIG. 1 that the micromechanical grating and eventually additionally an associated drive circuit can be realized cost-effectively in a wafer matrix with CMOS compatible technology. In that way, large numbers of gratings can be produced with holder and suspension, respectively, in an efficient way.

Since the detector 20, as it is illustrated in FIG. 1, can be designed as single element, such as a photodiode or a photomultiplier, eventually with an associated slit, the costs of the spectrometer are significantly decreased compared to the miniature spectrometer with photodiode line described in the introduction of the specification. Accordingly, the spectrometer of FIG. 1 can be produced in high volumes with very favorable conditions. Above that, the spectrometer of FIG. 1 offers the possibility to combine a good resolution with a large and variable spectral range with at the same time very compact construction. At the same time, the spectrometer is insensitive against shock and vibration due to the vibratable suspension of the grating and requires only a minimal or even no calibration effort.

Figure 2:
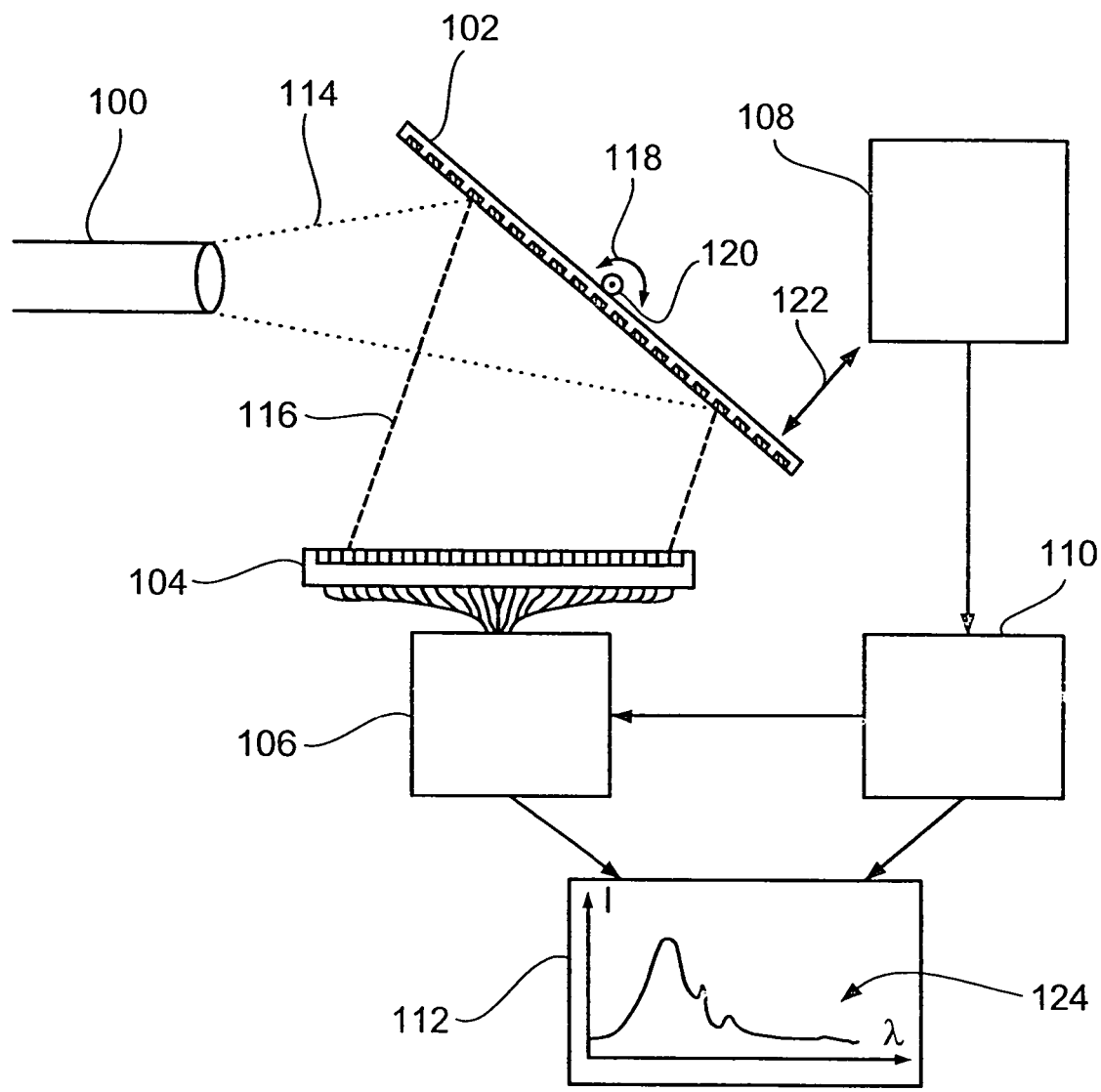
FIG. 2 is a specific realization of a spectrometer according to the present invention.

With reference to FIG. 2, in the following, a specific realization of a spectrometer according to an embodiment of the present invention will be described, which has a resonantly operated grating as well as a photodiode line, and thus combines the advantages of a moveable dispersive element with the ones of a detector line. Particularly, the spectrometer of FIG. 2 can be used as process spectrometer.

The spectrometer of FIG. 2 consists of an optical fiber 100, a moveable or vibrating gate 102, a detector line 104, such as photodiode or CCD line, which consists of a plurality of detector elements, which are numbered, an evaluation circuit 106, a grating drive 108, a control means 110 and a calculating unit 112. The control means is connected to the detector line 104 via the evaluation circuit 106, to supply a signal to the same for triggering the exposure and shutter signals, respectively, with the grating drive 108 to obtain information about the current position of the grating 110 from the same, and to the calculating unit 112 to supply information to the same, which are required for deriving a wavelength scale for the intensity values detected by detector line 104 or indicate this wavelength scale itself. The calculating unit is also connected to the detector line via the evaluation circuit 106, to obtain the detected wavelength-dependent intensity values from the same.

At the same time, the optical fiber 100 serves as entrance slit and is suitably disposed to launch a light, whose spectral distribution is to be determined, into the spectrometer such that it impinges on the vibrating grating 102, as it is indicated by the dotted lines 114. The optical fiber 100 is, for example, a cross section of 50 to 200 μm. The light 114 impinging on the grating 102 is split into its spectral components by the grating 102, and impinges, as it is illustrated by the broken lines 116, on the detector line 104. Every detector element of the detector line 104 outputs the detected intensity to the evaluation circuit 106, which passes these intensities on to the calculating unit 112 by indicating the respective detector element number of the respective detector element.

The grating drive circuit 108 effects a vibration of the grating 102 around an axis 120, substantially with the resonance frequency of the grating 102. The drive by the drive circuit 108 is performed by a mechanic, inductive or capacitive or other suitable coupling 122. The drive circuit 108, which regulates the vibration frequency of the grating 102 substantially to the resonance frequency, detects also the current position of the grating 102 and outputs this information to the control unit 110. As has already been described with reference to FIG. 1, the current position of the grating 102 defines a wavelength for every detector element, which is detectable for this detector element. Accordingly, every position is associated with a wavelength range, within which the spectrally split light 116 is sampled by the detector line, or a position of a central wavelength along an extension direction of the detector line. The detector line is disposed slanted and preferably horizontal to a plane which runs parallel to the axis 102 and encloses an angle with the mirror surface of the grating 102 in the resting position of the same, which is equal to the angle of incidence of the light beam 114.

The control means 110 monitors information about the current position of the grating 102 and outputs triggering impulses to the evaluation circuit 106 at the times when an exposure and shot, respectively, is to be performed by the photodiode line 104, which again passes the same on to the photodiode line 104 to cause the detector elements to take the shot of the light 116 split in a wavelength-dependent way.

Additionally, the control unit 110 calculates for every triggering impulse or every position of the grating 102 at the time of the triggering impulse the wavelength range, which is associated with the position of the grating 102 at this exposure time and indicates, which wavelength range is sampled by the detector elements of the detector line 104 at the exposure time, or another equivalent indication, such as the position of the central wavelength at the time of exposure in units of the detector element number, and supplies this information to the calculating unit 112, which based on this information associates a wavelength with every intensity and every associated photodiode number, respectively, and thereby calibrates the wavelength scale. The calculating unit 112 outputs the spectral distribution of the light 114 as output signal, as it is illustrated schematically by a graph 124, where the x axis corresponds to the wavelength λ and the y axis the intensity I, and wherein an exemplary spectral intensity distribution is illustrated schematically. Thus, the output signal of the calculating unit 112 corresponds a representation of the measured intensity signals against the calculated wavelength scale, which again corresponds to the measured optical spectrum of the incident light 114.

The spectrometer of FIG. 2 can be operated in different modes of operation. In a first mode of operation, the control unit 110 determines the exposure and sample times, respectively, such that the same are always performed at a specific position of the grating 102 and a specific deflection of the same, respectively. Thus, the control unit controls the shot and shutter function, respectively, of the detector line 104. Consequently, every shot of the detector line 104, which is output to the calculating unit 112 via the evaluation circuit 106, corresponds to the same wavelength range, which is associated with the specific position and deflection, respectively, of the grating 102. In this mode of operation, the result output by the calculating unit 112 corresponds to a single shot by the detector line 104 and comprises as many shots as detector elements are comprised in the detector line 104, and is defined by a resolution and a wavelength range, as they are determined by the length of the detector line 104, the distance of the detector elements of the detector line 104, the grating number of the grating 102 as well as the positional relation of the grating 102 to the detector line 104. By changing the exposure time and the phase difference, respectively, between the vibration frequency of the grating 102 and the sample frequency of the photodiode line 104, the wavelength scale and the wavelength range of the spectral distribution, respectively, which is output by the calculating unit 112, variable, for example manually via a rotary switch or in a programmed way, without changing the resolution of the spectrum output by the calculating unit 112.

In a further mode of operation, the control unit 110 effects several shots and exposures, respectively, by the detector line 104, which are combined by the calculating unit 112 to determine the spectral distribution of the light 114. The control unit 110 outputs the trigger impulses to the drive circuit 106, for example with a frequency, which corresponds to an integer plurality n or a fully rational plurality n/m. As has been described above, in that way n and n×m shots, respectively, of the spectral distribution of the light 114 result in different positions of the grating 102 per vibration and after every (n*m)th vibration, wherein each shot consists of so many sample values as detector elements exist. The control unit defines the exposure times, for example, with a frequency, which corresponds to twice the vibration frequency of the grating 102. Accordingly, two exposures and shots, respectively, are sampled by the photodiode line 104 per vibration and passed on to the calculating unit 112. Both shots correspond to two different and, with appropriate phase position and deflection, not overlapping wavelength ranges, which complement one another. For every shot, the calculating unit 112 receives the respective wavelength range, which the control unit 110 calculates from the position at the exposure time received by the drive unit 108. In that way, the determination of the spectral distribution of the light 114 can be combined of several shots with different and preferably adjacent wavelength ranges. However, it would also be possible that the control unit 110 chooses the phase shift between the exposure and the vibration such that the wavelength ranges and wavelength scales, respectively, of these shots essentially correspond, wherein, however, the wavelengths which correspond to individual detector elements during the different shots are interleaved, so that virtually the photodiode density of the photodiode line 104 is increased and thus the spectrum is detected with an increased resolution. Combinations of interleaved and not interleaved wavelengths portions of the different shots to be combined are also possible.

The calculating unit 112 can output the different shots after the combination in different formats, such as every intensity values in pairs with its associated wavelength, and from every exposure of every detector element. Further, it is possible that the calculating unit 112 combines the different composite shots and then interpolates them and shots them again to obtain the spectral distribution in a form where the spectral intensity values are equidistant, as it is required for different applications for the further evaluation of the spectrum.

With reference to FIG. 2, it should be noted that the movement of the grating 102 could also take place quasistatically or with a none resonant vibration, but that by the resonant operation of the spectrometer of FIG. 2 an insensibility against shock and vibration, a reduction of the calibration effort and, due to the resonance amplification, a sufficient deflection is also achieved with miniaturized realizations.

Thus, the spectrometer of FIG. 2 is based on a combination of the miniature spectrometer type described in the introduction of the specification with fixed grating with the possibilities of the vibrating grating and vibrating mirror, respectively, which has here a grating structure produced, for example, in CMOS-compatible microtechnique instead of a simple mirror surface. The grating structures have, for example, 500 or more lines per millimeter. The drive is performed, for example, capacitively via interdigital electrodes.

Due to the ability to combine shots, which consist of spectral components of interleaved wavelengths, the spectrometer of FIG. 2 can be operated with a maximum possible resolution, which depends on the geometrical dimension and particularly the so-called base length of the spectrometer, the size of the entrance and exit slit, the used refractive order and the grating line number, and particularly, is independant of the physical dimensions of the spectrometer, as the detector element distance and the base length, which can be subject to strict limitations in miniature applications. Therefore, even with integrated realization solutions, despite limited geometrical dimensions, a sufficient resolution and a large spectral detection range can be obtained by combining different shots.

Finally, with reference to FIGS. 1 and 2, it should be noted that for an easier understanding, elements, which are typically used in optics, such as elements collimating beams and elements limiting the beam geometry, such as planar or curved mirrors, lenses and slits, have been omitted in the above description, but that the same can be used advantageously in the different embodiments.

Only for the sake of completeness, it should be noted that due to the constant movement and vibration, respectively, of the grating, the usage of a fast photodiode with appropriate bandwidth, which has, for example, a thousand times larger readout frequency compared to the mirror frequency, can be advantageous.

Further, despite the fact that a mirror with a grating structure has been used above as a dispersive element, a simple grating in transmission or a prism-formed object could be used. With reference to the detector line of FIG. 2, it should be noted that not only a detector line with a straight arrangement of the detector elements but further an array of detector elements or an arrangement of detector elements on a curved line could be used.

The present invention can be used in a plurality of fields, which comprise the emission, absorption or transmission spectroscopy, wherein the light radiation to be examined spectrally can be examined in any wavelength range, such as in the infrared, visible or ultraviolet range.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A spectrometer, comprising:
   a vibratably suspended and micromechanically produced dispersive element for spectrally decomposing a light beam, whose spectral distribution is to be determined, into spectral components;
   a means for putting the vibratably suspended dispersive element into vibration with a vibration frequency, which has such a relationship to the natural frequency of the vibratably suspended dispersive element that a resonance amplification of the vibration of the dispersive element occurs;
   a detector for detecting a spectral component of the light beam with a sampling frequency;
   wherein
   the sampling frequency has a fully rational ratio of n/m to the vibration frequency, with n being relatively prime with respect to m.

2. The spectrometer according to claim 1, further comprising:
   a means for synchronizing the vibration of a dispersive element with the readout of the detector.

3. The spectrometer according to claim 1, wherein a different wavelength is associated with any possible position of the dispersive element, which corresponds to a spectral component, which can be detected currently by the detector, and which further comprises:
   a means for detecting a current position of the dispersive element at the time of the detection of the spectral component by the detector; and
   a control means for associating a wavelength corresponding to the detected position with the spectral component detected by the detector.

4. The spectrometer according to claim 1, wherein the dispersive element is a micromechanically produced mirror with a grating structure, which is formed in a semiconductor chip.

5. The spectrometer according to claim 1, wherein the control unit comprises:
   a means for driving the detector with a detection signal with the sampling frequency.

6. The spectrometer according to claim 1, where the detector is a photomultiplier, a photodiode, a photodiode line or a CCD line.

7. The spectrometer according to claim 1, where the dispersive element is a micromechanically produced mirror with a grating structure.

8. The spectrometer according to claim 1, where the frequency is in a range, which reaches from 90% to 110% of the natural frequency of the vibratably suspended dispersive element.

9. A method for determining the spectral distribution of a light beam, comprising:

spectrally decomposing the light beam whose spectral distribution is to be determined, into spectral components by a vibratably suspended and micromechanically produced dispersive element, putting the vibratably suspended dispersive element into a vibration with a vibration frequency, which has such a relationship with the natural frequency of the vibratably suspended dispersive element that a resonance amplification of the vibration of the dispersive element occurs; and detecting a spectral component of the light beam by a detector with a sampling frequency, wherein the sampling frequency has a fully rational ration of n/m to the vibration frequency, with n being relatively prime with respect to m.

* * * * *